UNITED STATES PATENT OFFICE.

MINERVA A. WIDGER, OF DE KALB, ASSIGNOR OF ONE-HALF HER RIGHT TO DAVID F. BARCLEY AND MARCUS MALLORY, OF ELGIN, ILLINOIS.

IMPROVEMENT IN PREPARING RENNET FOR MAKING CHEESE, &c.

Specification forming part of Letters Patent No. 146,851, dated January 27, 1874; application filed December 13, 1873.

*To all whom it may concern:*

Be it known that I, MINERVA A. WIDGER, of De Kalb, in the county of De Kalb and State of Illinois, have invented a new and useful Process for Increasing the Coagulating Properties of Rennet; and I do hereby declare the following to be a full, clear, and exact description thereof, which will enable others skilled in the art to which my invention appertains to compound the ingredients employed, and to use the same.

My invention relates to a process for increasing the coagulating properties of rennet used in coagulating milk for the manufacture of cheese; and to that end it consists in the employment of a solution composed of nitrate of potassa and alcohol, which is applied to the green rennet, together with a proper proportion of common salt. The rennet, when sufficiently dry, is cut in pieces and placed in a tight vessel, and a quantity of sweet whey or water added. The whole is then allowed to remain a given time, when the required quantity of liquid to be used is strained off, adding each day to the remaining liquid a quantity of sweet whey or water equal to the amount of liquid used.

In carrying out my invention, take of pulverized nitrate of potassa, two parts, and alcohol, one part, each by weight, mix the same together and add a sufficient amount of water to dissolve the nitrate of potassa. To each green rennet apply two ounces of common fine salt, and one ounce of the solution, distributing the same evenly over the rennet; then hang the same in a warm dry place and allow it to remain for about thirty days, by which time it will be properly cured.

To use the rennet, take about the following proportions—that is to say—take five rennets, cut them in pieces and place in a tight vessel, add two quarts of sweet whey or water, let it remain for about three days, stirring the same each day, when it will be ready for use.

To each two thousand pounds of milk, heated in the usual manner, add one-half pint of the strained liquid, allowing the milk to remain for thirty minutes, when the same will be properly coagulated.

To obtain the full strength of the rennet, add each day to the liquid remaining in the vessel a quantity of sweet whey or water, equal to the amount taken from the vessel, together with a small quantity of salt, until it is found that its coagulating properties are decreasing; then remove the rennet and add a new amount, as at first.

It is found, by actual experiment, that the coagulating properties of rennet cured in a solution of nitrate of potassa, alcohol, and salt, as specified, are much greater than with those cured in the usual manner—that is to say, the coagulating properties of one rennet is equal to that of three. This is produced by preventing the rennet from becoming decomposed while being cured or soaked for use, thereby preserving the full strength. This may be accomplished by other solutions than that formed of the ingredients mentioned—that is to say, in place of the nitrate of potassa, or in admixture with it, the nitrates of soda, lime, or magnesia may be used, which will have the same chemical action on the rennet, thereby preserving the same.

I do not wish to confine myself to this process for curing green rennets only, as the same may be used with rennets cured in the usual manner and with a like result, the same preventing the rennet from decomposing while being soaked for use. In this latter case the same quantity of the solution is added when the rennet is put in soak, adding a small quantity of the solution each day as the liquid is used.

Having described my invention, I claim—

The process of increasing the coagulating properties of rennet by the use of nitrate of potassa and alcohol, or their equivalents, applied to the green rennet or used with previously-cured rennets, in the manner specified.

The above specification of my process signed by me this 8th day of December, 1873.

MINERVA A. WIDGER.

Witnesses:
ELI B. GILBERT,
M. E. NEARING.